United States Patent [19]

Leininger et al.

[11] Patent Number: 5,577,843
[45] Date of Patent: Nov. 26, 1996

[54] SELF-ALIGNING, SELF-LOCKING PLASTIC BUSHING INCLUDING A METHOD FOR MOUNTING THE BUSHING TO A WHEEL ASSEMBLY

[75] Inventors: Mary M. Leininger, Brown Deer, Wis.; Danny C. Young, Hayti, Mo.

[73] Assignee: Gleason Corporation, Milwaukee, Wis.

[21] Appl. No.: 320,682

[22] Filed: Oct. 11, 1994

[51] Int. Cl.⁶ .................................................. F16C 17/02
[52] U.S. Cl. .......................... 384/275; 384/296; 384/909
[58] Field of Search .................................. 384/222, 275, 384/296, 295, 908, 907, 909

[56] References Cited

U.S. PATENT DOCUMENTS

| | | | |
|---|---|---|---|
| 2,797,605 | 7/1957 | Metze, Jr. et al. | 85/4 |
| 3,091,795 | 6/1963 | Budwig | 16/2 |
| 3,438,686 | 4/1969 | Stone . | |
| 4,058,344 | 11/1977 | Dyson | 384/908 |
| 4,883,319 | 11/1989 | Scott | 403/162 |
| 5,145,265 | 9/1992 | Flem | 384/296 |

*Primary Examiner*—Lenard A. Footland
*Attorney, Agent, or Firm*—Edward J. DaRin

[57] ABSTRACT

A plastic bushing for use with wheel assemblies for low speed, off-highway vehicles of the type of hand trucks, wheelbarrows and the like. The plastic bushing is constructed of two substantially identical bushing members molded of a self-lubricating, preselected plastic and each having a flanged end for abutting the central opening of a wheel assembly. Each plastic bushing member is provided with diametrically spaced locking fingers with locking windows defined in the body of the bushing members for snap-locking to the locking fingers when aligned within the wheel assembly opening. The method of mounting the bushing members includes producing relative movement between the bushing members to cause the pair of locking fingers of one bushing member to self-align with the locking window of the other bushing member to cause the locking fingers to be snap-locked to an edge of the window and maintained in operative relationship within the opening of the wheel assembly by the flanged ends of the bushing members abutting the wheel assembly. A supporting shaft for the wheels of the off-highway vehicle is rotatably supported within the thus assembled plastic bushing.

3 Claims, 2 Drawing Sheets

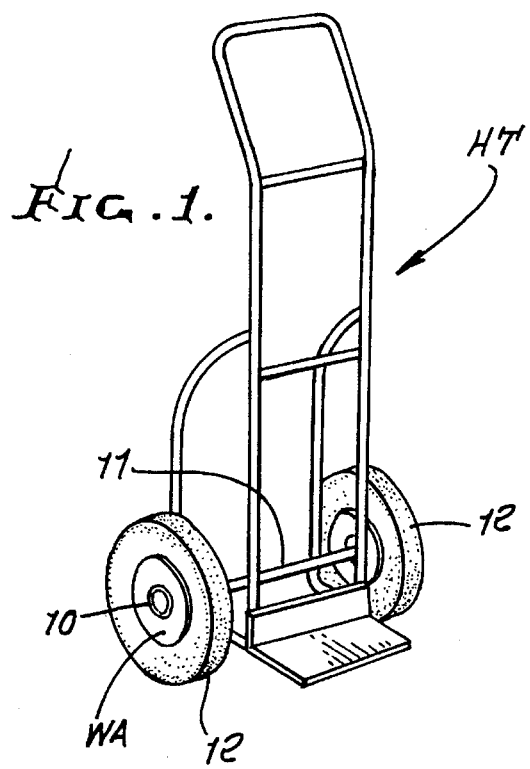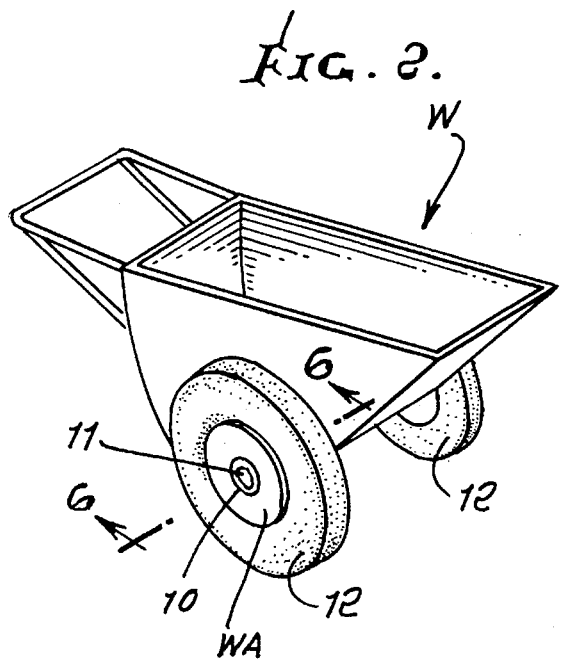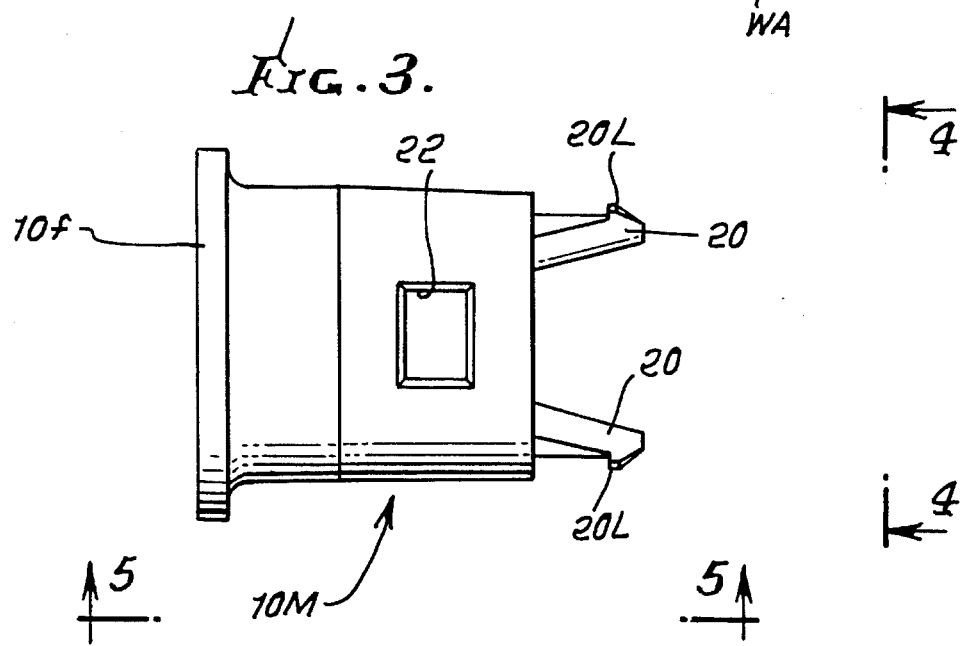

SELF-ALIGNING, SELF-LOCKING PLASTIC BUSHING INCLUDING A METHOD FOR MOUNTING THE BUSHING TO A WHEEL ASSEMBLY

FIELD OF INVENTION

This invention relates to a plastic bearing support bushing and more particularly to a plastic bushing for a low speed, off-highway vehicle such as a wheelbarrow or a hand truck for ready assembly to the wheel assembly therefor.

BACKGROUND OF INVENTION

At the present time, low speed, off-highway vehicles utilize wheel assemblies constructed of steel disc halves that are welded together and employ a one piece steel bearing. The steel bearing must be inserted into the wheel steel disc halves prior to welding the disc halves together and painting. Plastic bushings were not considered practical since the heat generated from welding and painting ovens would exceed the melting point of most plastic materials. These prior art wheel assemblies for the off-highway vehicles require steel tubing for receiving the bearing and a grease zerk. Accordingly, there is a present need for a plastic bearing to be used on the low speed, off the road vehicles that can be readily mounted to the wheel assemblies for such vehicles after the assembly operations requiring high heat are completed.

Various types of plastic bushings are presently known in the art. A one piece bearing support bushing is disclosed in U.S. Pat. Nos. 3,438,686 and 5,145,265. These one piece plastic bushings are designed to permit them to be compressed for mounting in the base of a workpiece or bearing. Two piece plastic bushings are disclosed in prior U.S. Pat. Nos. 2,797,605, 3,091,795 and 4,883,319. U.S. Pat. No. 2,797,605 discloses a two part fastener that is constructed with shanks having a plurality of sections spaced longitudinally thereon for receiving the shank sections of the other element and adapted to be locked together in a bore. U.S. Pat. No. 3,091,795 discloses a grommet of two piece construction mountable from opposite sides of an opening in a panel, while U.S. Pat. No. 4,883,319 discloses a self-locking, plastic spacer bushing for use in a hinge for an automotive vehicle seat assembly consisting of identical inter-locking sleeves. The sleeves are thin walled and cannot carry a substantial radial load; see Col. 3, lines 51–57. None of these prior art bushings are useful in the wheel assemblies for low speed, off-highway vehicles such as wheelbarrows and hand trucks or the like.

SUMMARY OF INVENTION

The present invention provides an improved, less expensive, rust free, self-lubricating plastic bushing for mounting to low speed, off-highway vehicles of the type of a wheelbarrow and/or hand truck that withstands the loads to which the off-highway vehicles are subjected to. The improvements comprehend the simple method of mounting a plastic support bushing in the central opening of a conventional wheel assembly for off the highway vehicles of the aforementioned types. No welding or metal tubes are required as in prior art known structures.

From a structural standpoint, the improved plastic bushing comprises a pair of substantially identical busing members each having a flange at one end and mountable to a wheel opening from opposite sides thereof with the flanged ends abutting the wheel opening. The bushing members are provided with co-acting male-female portions provided for each bushing member that are self-alignable and self-locking within the wheel opening. The plastic selected for constructing the plastic bushing is of the self-lubricating type including the polyoxymethylene copolymer plastic materials.

The method of mounting the plastic support bushing to a wheel assembly includes the step of positioning one of a pair of bushing members in an opening for a wheel assembly with the flanged end of the bushing member engaging the wheel assembly at the central opening therefor. The other bushing member is mounted to the wheel assembly on the opposite side thereof from the first mentioned bushing member, each bushing member is provided with at least a female and male element adjacent to the ends opposite to the flanged ends, and producing relative rotation of one of the bushing members relative to the other bushing member in the central opening of the wheel assembly for aligning the female and male elements for each of the bushing members to cause the male element of each bushing member to align and self-lock to the aligned female member of the other bushing member whereby the bushing members are locked in axial, abutting relationship within said central opening and held in place in said central opening by the flanged ends of the bushing members. The method steps may include mounting a wheel shaft within the thus assembled plastic support bushing.

BRIEF DESCRIPTION OF THE DRAWINGS

These and other features of the present invention may be more readily appreciated when considered in the light of the following specifications and drawings, in which:

FIG. 1 is a front perspective view of an off-highway vehicle in the from of a two-wheel, hand truck and embodying the present invention;

FIG. 2 is a side perspective view of an off-highway vehicle in the form of a wheelbarrow and embodying the present invention;

FIG. 3 is a side elevational view of a single bushing member for the plastic bushing of the present invention;

FIG. 6 is a cross-sectional view of a pair of bushing members locked together in the central opening of a wheel assembly and illustrating a typical axle or supporting shaft for an off-highway vehicle of the types of FIGS. 1 and 2 and the like.

DETAILED DESCRIPTION OF THE PREFERRED EMBODIMENT

Figure 4:
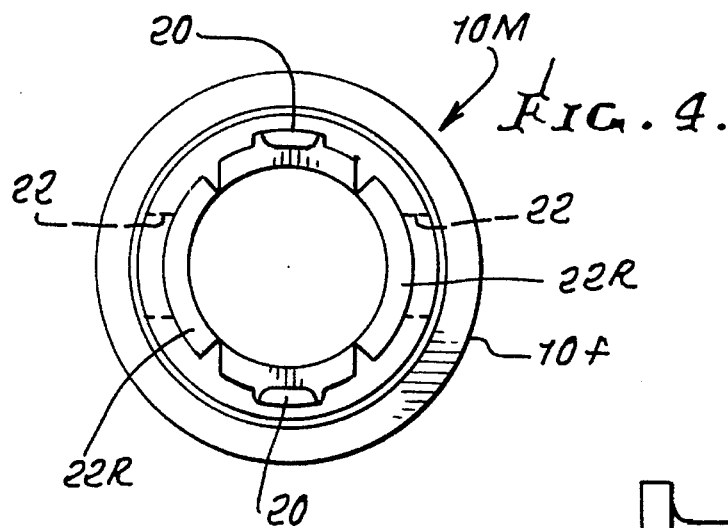
FIG. 4 is an end view of the bushing of FIG. 3 taken along the line 4—4 of FIG. 3.

Now referring to the drawings, the presently preferred embodiment of the plastic bushing 10 mounted to a conventional wheel assembly WA constructed of steel disc halves that are welded together and mount an axle or supporting shaft 11 for the rubber tires 12 of the low speed, off-highway vehicles of the type with which the plastic bushing 10 of the present invention is useful. The plastic bushing 10 is constructed and defined of sufficient wall thickness to withstand the loads the off-highway wheel assemblies WA are subjected to including substantial radial loads.

Figure 6:
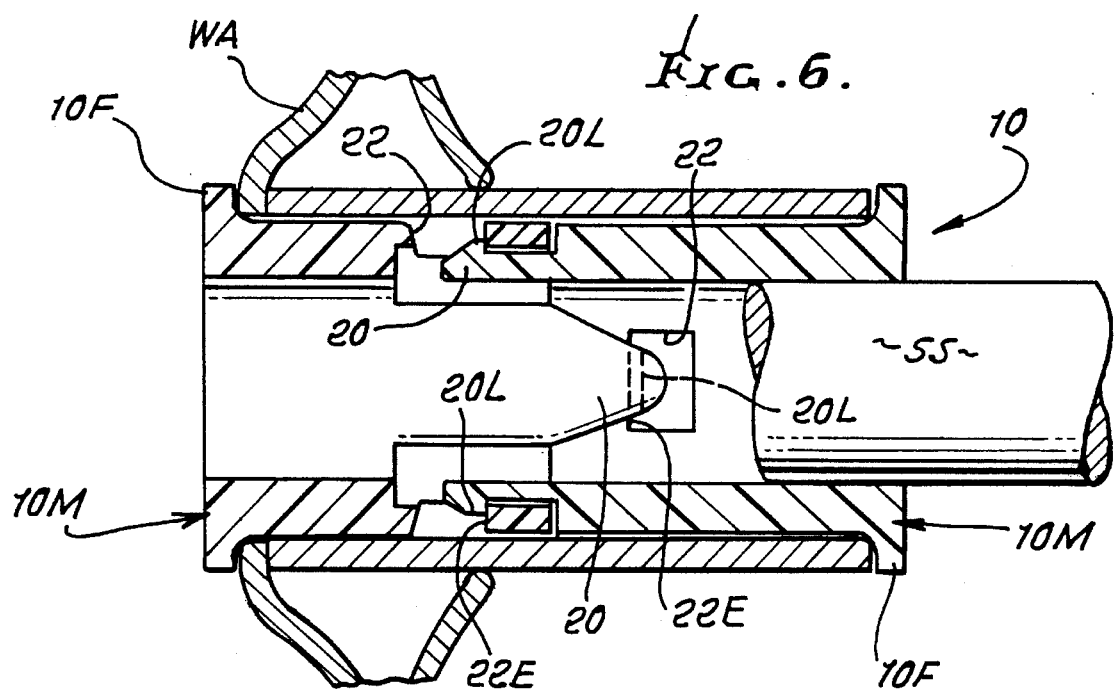

The plastic bushing 10 comprises two substantially identical bushing members 10M mountable to the central opening of the wheel assembly from opposite sides thereof. Only one bushing member 10M need be described since the two members 10M are substantially identical. The members 10M are molded of a preselected plastic in the form of a hollow cylinder to be mounted inside the central opening of the wheel assembly and to receive a wheel supporting shaft or axle, as illustrated. One end of the bushing member 10M is provided with a mounting flange 10F for engagement with the portions of the wheel assembly WA adjacent the central opening provided for the assembly. The bushing members 10M are constructed and defined to have a length so that when the two members 10M are assembled to and locked within the central opening of the wheel assembly WA they are co-extensive with the length of the central opening when the flanges 10F abut the opposite sides of the wheel assembly, as best illustrated in FIG. 6.

Since the plastic bushing 10 is used to support a rotatable axle or shaft, the selection of the plastic for molding the bushing 10 should have self-lubricating properties to permit 360 degrees of rotation of the supporting shaft or axle. The presently preferred plastic is from the acetal copolymer family of plastics commercially available as Celcon M90, Natural (TLP) from Hoechst Celanese Corporation of 26 Main Street, Chatham, N.J. 07928. The chemical name of the plastic is a polyoxymethylane copolymer.

Figure 5:
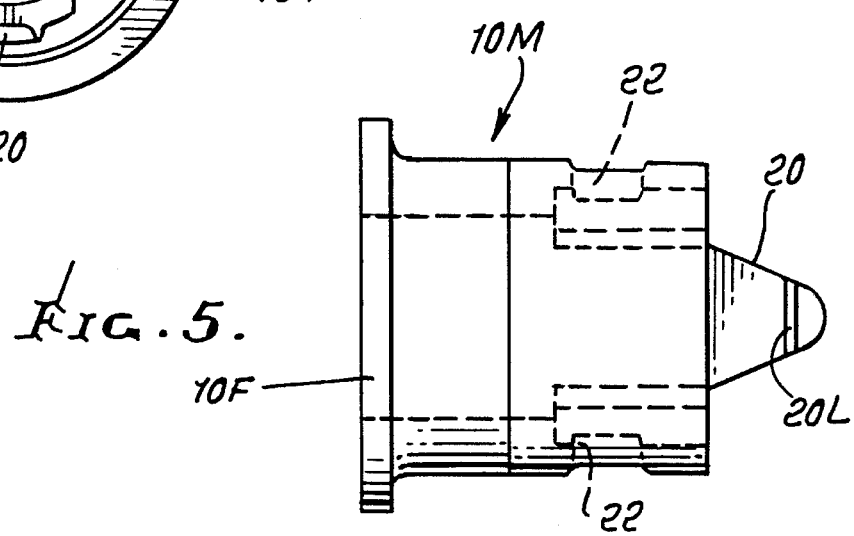
FIG. 5 is an elevational view of the bushing member taken along the line 5—5 of FIG. 3.

An important feature of the plastic bushing 10 is that the bushing members 10M are defined to be readily self-aligning and self-locking within the opening of the wheel assembly WA. For this purpose, the bushing member 10M is provided with male-female portions that permit the pair of bushing members 10M to be self-aligning within the wheel assembly and when aligned to be self-locking. To this end, the male locking elements comprise locking fingers 20 extending outwardly of the opposite end of the bushing members 10M from the flanged end 10F. The locking fingers 20 are constructed and defined for locking engagement with the female locking elements of the member 10M illustrated as the locking windows 22 defined in the body of the member 10M adjacent the end mounting the fingers 20. A pair of fingers 20 are illustrated in the drawings extending a preselected distance outwardly of the end of the bushing member 10M for locking engagement with the locking window 22 of the other bushing member 10M; see FIG. 6. To this end, the pair of fingers 20 are diametrically spaced apart on the body of the member 10M with a pair of locking windows 22, arranged at diametrically spaced locations on the body of the member 10M but rotated approximately 90 degrees to be between the locking fingers 20. The locking figners 20 for the purposes of the present invention are tapered to form a bull-like nose for the free ends of the fingers 20 with locking element 20L defined adjacent the bull nose end of the finger that extends a preselected distance upwardly of the finger so as to be snap locked to the locking edge 22E of the locking window 22 when positioned therein, as best seen in FIGS. 3, 5 and 6. The locking edge 22E of the locking windows 22 preferably have a small draft on the order of 10 degrees to facilitate the locking to the fingers 20 thereto. The inside wall of the member 10M is constructed of a reduced thickness around the areas defining the windows 22 and intermediate the fingers 20 or the areas 22R as illustrated in FIG. 4.

The self-aligning and self-locking features of the plastic bushing 10 can be best appreciated by considering the method of mounting the two bushing members 10M to the central opening of the wheel assembly WA. One of the bushing members 10M is first mounted to the wheel assembly WA so that the flange 10F abuts the outer surface of the wheel assembly as best seen in FIG. 6. This then positions the locking fingers 20 substantially centrally of the central opening of the wheel assembly WA. The other bushing member 10M is then mounted in the opening of the wheel assembly WA to extend inwardly of the opening. The mounting of the latter member 10M is spaced and/or rotated so that the fingers 20 thereof extend between the fingers 20 of the previously mounted member 10M. The relative rotation of the members 10M causes the locking fingers 20 of each member to be slidably received at the locking edge 22E of the locking windows 22 for the diametrically aligned member 22 (See FIG. 6) whereby the members 10M are locked in axial, abutting relationship within the opening of the wheel assembly WA and held in place therein by the provision of the flanged ends 10F.

In a practical embodiment of the plastic bushing 10 that has been injection molded of CELCON and the bushing members 10M are locked together, the bushing measures approximately 1.250 inches in outside diameter with an inside diameter of approximately 0.638 inches and a length of 2.25 inches and a wall thickness of ⅜ inch to accept a shaft of approximately 1 inch in diameter fitting into the central opening of the wheel assembly WA. A portion of a supporting shaft SS is illustrated in FIG. 6 mounted to the right end of the wheel assembly. The shaft SS mounting the rubber tires, pneumatic or solid rubber for the off the road vehicles "HT or W" of the type of FIGS. 1 and 2.

We claim:

1. A self-aligning, self-locking plastic support bushing adapted for mounting into a wheel opening comprising a pair of substantially identical tubular bushing members each having a mounting flange at one end for holding the bushing members in a wheel opening in an axially aligned relationship, each of the bushing members having male locking elements extending outwardly of the opposite ends of the bushing members from the flanged ends and female locking elements defined in the tubular walls of the bushing members to lockably receive the male locking element of the coacting bushing member when the female and male elements are axially aligned, said female elements are openings in the tubular walls spaced to be rotatably aligned with the male locking elements for receiving said ends of the male locking elements in a snap-lock relationship, said male locking elements comprise a plurality of male locking elements and the tubular wall is reduced in thickness in the areas adjacent said opposite ends and female openings are arranged within said areas of reduced thickness for receiving and locking to an end of the female opening when the bushing members are axially aligned in abutting relationship.

2. A self-aligning, self-locking plastic bushing as defined in claim 1 wherein said male locking elements are tapered from said opposite ends of the bushing members for facilitating the self-alignment with the female members and having a tapered locking element for the lockable engagement with a female locking element.

3. A self-aligning, self-locking plastic bushing as defined in claim 1 wherein said plastic bushing is constructed of a self-lubricating plastic material and having substantial thickness for carrying loads including radial loads that the associated wheel is subjected to.

* * * * *